United States Patent
Bennett

(10) Patent No.: US 9,674,339 B2
(45) Date of Patent: Jun. 6, 2017

(54) MOBILE PHONE AS A ONE-WAY RECORDED TRANSMITTER OVER A CELLULAR NETWORK

(71) Applicant: World Emergency Network—Nevada, Ltd., Carson City, NV (US)

(72) Inventor: Christopher Ryan Bennett, St. Petersburg, FL (US)

(73) Assignee: World Emergency Network—Nevada, Ltd., Carson City, NV (US)

(*) Notice: Subject to any disclaimer, the term of this patent is extended or adjusted under 35 U.S.C. 154(b) by 0 days.

(21) Appl. No.: 15/068,362

(22) Filed: Mar. 11, 2016

(65) Prior Publication Data

US 2016/0198041 A1    Jul. 7, 2016

Related U.S. Application Data

(63) Continuation of application No. 14/537,628, filed on Nov. 10, 2014, now Pat. No. 9,313,323, which is a
(Continued)

(51) Int. Cl.
*H04M 3/22* (2006.01)
*H04M 11/04* (2006.01)
(Continued)

(52) U.S. Cl.
CPC .. *H04M 3/2281* (2013.01); *G06Q 10/063114* (2013.01); *G06Q 50/265* (2013.01);
(Continued)

(58) Field of Classification Search
CPC .... H04M 3/2281; H04M 1/656; H04M 1/658; H04M 11/04; H04W 4/16; H04W 8/22; H04L 63/30
See application file for complete search history.

(56) References Cited

U.S. PATENT DOCUMENTS 5,734,659 A    3/1998 Mann et al.
5,974,309 A    10/1999 Foti
(Continued)

FOREIGN PATENT DOCUMENTS

CN    1343425 A    4/2002
CN    1917456 A    2/2007
(Continued)

OTHER PUBLICATIONS

Australian Office Action, Australian Application No. 2014201981. Mar. 4, 2015, 2 pages.
(Continued)

*Primary Examiner* — Nathan Mitchell
(74) *Attorney, Agent, or Firm* — Fenwick & West LLP

(57) ABSTRACT

Agencies oftentimes desire to monitor personnel in the field during the course of their duties. To provide flexible monitoring capabilities to agencies, a common mobile device such as a mobile phone is converted for use as a radio-based listening system to collect and transmit audio data. Phone features and accessories are leveraged to collect additional data for transmission. Collected data is streamed or otherwise transmitted to monitoring devices at the agency or in the field for operational oversight and recordation.

20 Claims, 8 Drawing Sheets

Related U.S. Application Data continuation of application No. 14/086,940, filed on Nov. 21, 2013, now Pat. No. 8,934,847, which is a continuation of application No. 13/482,966, filed on May 29, 2012, now Pat. No. 8,626,078.

(60) Provisional application No. 61/491,823, filed on May 31, 2011, provisional application No. 61/549,657, filed on Oct. 20, 2011.

(51) Int. Cl.
| | | |
|---|---|---|
| *H04M 1/658* | (2006.01) | |
| *H04W 8/22* | (2009.01) | |
| *H04L 29/06* | (2006.01) | |
| *H04M 1/656* | (2006.01) | |
| *H04W 4/16* | (2009.01) | |
| *G06Q 10/06* | (2012.01) | |
| *G06Q 50/26* | (2012.01) | |

(52) U.S. Cl.
CPC ............ *H04L 63/30* (2013.01); *H04M 1/656* (2013.01); *H04M 1/658* (2013.01); *H04M 11/04* (2013.01); *H04W 4/16* (2013.01); *H04W 8/22* (2013.01)

(56) References Cited

U.S. PATENT DOCUMENTS

| | | | |
|---|---|---|---|
| 6,301,246 B1 | 10/2001 | Shaffer et al. | |
| 6,449,474 B1 | 9/2002 | Mukherjee et al. | |
| 6,553,025 B1 | 4/2003 | Kung et al. | |
| 6,931,236 B2 | 8/2005 | Kaplan | |
| 7,181,017 B1 | 2/2007 | Nagel et al. | |
| 7,626,980 B1 | 12/2009 | Croak et al. | |
| 7,873,349 B1 | 1/2011 | Smith et al. | |
| 8,686,837 B2 * | 4/2014 | Larsen | G08C 23/04 340/13.24 |
| 8,712,362 B2 * | 4/2014 | Cilia | G10L 19/012 455/343.1 |
| 8,761,687 B2 * | 6/2014 | Chang | G07C 5/0866 455/566 |
| 8,971,555 B2 * | 3/2015 | Koss | H04M 3/53366 381/312 |
| 9,253,311 B2 | 2/2016 | Bennett | |
| 2001/0016037 A1 | 8/2001 | Fritzinger et al. | |
| 2001/0019604 A1 | 9/2001 | Joyce et al. | |
| 2001/0036821 A1 | 11/2001 | Gainsboro et al. | |
| 2002/0061100 A1 | 5/2002 | DiCamillo et al. | |
| 2002/0132638 A1 | 9/2002 | Plahte et al. | |
| 2002/0181460 A1 | 12/2002 | Strathmeyer et al. | |
| 2002/0198007 A1 | 12/2002 | Zimmerman | |
| 2003/0078041 A1 | 4/2003 | Dikmen et al. | |
| 2003/0215069 A1 | 11/2003 | Hitzeman | |
| 2004/0110465 A1 | 6/2004 | Bedingfield et al. | |
| 2004/0135686 A1 * | 7/2004 | Parker | G08B 13/19684 340/540 |
| 2004/0152442 A1 | 8/2004 | Taisto et al. | |
| 2004/0165709 A1 | 8/2004 | Pence et al. | |
| 2004/0208307 A1 | 10/2004 | Walker et al. | |
| 2004/0240439 A1 | 12/2004 | Castleberry et al. | |
| 2005/0074104 A1 | 4/2005 | Swartz | |
| 2005/0094773 A1 | 5/2005 | Peterson | |
| 2005/0111629 A1 | 5/2005 | Carlson et al. | |
| 2005/0175165 A1 | 8/2005 | Holder | |
| 2005/0180395 A1 | 8/2005 | Moore et al. | |
| 2005/0232253 A1 | 10/2005 | Ying et al. | |
| 2005/0277407 A1 | 12/2005 | Ahn et al. | |
| 2006/0034426 A1 | 2/2006 | Freudenberger et al. | |
| 2006/0140200 A1 | 6/2006 | Black et al. | |
| 2006/0147012 A1 | 7/2006 | Moody et al. | |
| 2006/0270465 A1 * | 11/2006 | Lee | H04M 1/7253 455/569.1 |
| 2006/0291638 A1 | 12/2006 | Radziewicz et al. | |
| 2007/0019618 A1 | 1/2007 | Shaffer et al. | |
| 2007/0036127 A1 | 2/2007 | Roosen et al. | |
| 2007/0047696 A1 | 3/2007 | Chen | |
| 2007/0161412 A1 | 7/2007 | Nevid et al. | |
| 2007/0183403 A1 | 8/2007 | Somers | |
| 2007/0286389 A1 | 12/2007 | Hyerle et al. | |
| 2008/0008105 A1 | 1/2008 | Black et al. | |
| 2008/0045186 A1 | 2/2008 | Black et al. | |
| 2008/0057929 A1 * | 3/2008 | Min | G08C 17/02 455/418 |
| 2008/0182547 A1 * | 7/2008 | Glover | H04M 11/04 455/404.1 |
| 2008/0198978 A1 | 8/2008 | Olligschlaeger | |
| 2008/0205626 A1 | 8/2008 | Mandalia et al. | |
| 2008/0215725 A1 | 9/2008 | Backer et al. | |
| 2008/0242271 A1 | 10/2008 | Schmidt et al. | |
| 2008/0291013 A1 * | 11/2008 | McCown | G06F 21/552 340/539.13 |
| 2009/0061872 A1 | 3/2009 | Hicks | |
| 2009/0074156 A1 | 3/2009 | Ku et al. | |
| 2009/0119100 A1 | 5/2009 | Akella et al. | |
| 2009/0141883 A1 | 6/2009 | Bastien | |
| 2009/0214008 A1 | 8/2009 | Mani | |
| 2010/0027766 A1 * | 2/2010 | Shin | H04M 3/5315 379/85 |
| 2010/0099461 A1 * | 4/2010 | Rahfaldt | H04M 1/72541 455/557 |
| 2010/0113086 A1 * | 5/2010 | Chang | G07C 5/0891 455/525 |
| 2010/0128857 A1 | 5/2010 | Logan | |
| 2010/0161683 A1 | 6/2010 | Leeds et al. | |
| 2010/0167687 A1 * | 7/2010 | Morrey | G01S 5/0009 455/404.1 |
| 2010/0189228 A1 | 7/2010 | Seyfetdinov | |
| 2010/0220843 A1 | 9/2010 | Bosan et al. | |
| 2011/0002480 A1 | 1/2011 | Smith et al. | |
| 2011/0026701 A1 | 2/2011 | Kirchhoff et al. | |
| 2011/0046920 A1 | 2/2011 | Amis | |
| 2011/0081009 A1 | 4/2011 | Ma et al. | |
| 2011/0164734 A1 | 7/2011 | Clark et al. | |
| 2012/0033081 A1 | 2/2012 | Smith et al. | |
| 2012/0149350 A1 | 6/2012 | Fan et al. | |
| 2013/0303151 A1 | 11/2013 | Johnson | |
| 2014/0194101 A1 | 7/2014 | Mullen et al. | |
| 2014/0302835 A1 | 10/2014 | Henderson et al. | |

FOREIGN PATENT DOCUMENTS

| | | |
|---|---|---|
| CN | 101112053 A | 1/2008 |
| CN | 201039280 Y | 3/2008 |
| EP | 1-835-691 A1 | 9/2007 |
| EP | 2767003 | 4/2013 |
| GB | 2456754 | 7/2009 |
| JP | 2001-237965 | 8/2001 |
| JP | 2001-268230 | 9/2001 |
| JP | 2004-013695 | 1/2004 |
| JP | 2005-123882 | 5/2005 |
| JP | 2006-074275 | 3/2006 |
| JP | 2007166089 | 6/2007 |
| JP | 2008-193250 | 8/2008 |
| JP | 2009-071603 | 4/2009 |
| JP | 2009-260492 | 11/2009 |
| RU | 2221345 C2 | 1/2004 |
| WO | WO 2005/031544 A2 | 4/2005 |
| WO | WO 2011/129420 | 10/2011 |

OTHER PUBLICATIONS

Canadian Office Action, Canadian Application No. 2,850,524, May 4, 2015, 5 pages.
Mexican Office Action, Mexican Application No. 13/013968, Feb. 20, 2015, 3 pages.
Mexican Office Action, Mexican Application No. 14/004373, Mar. 2, 2015, 3 pages.
Russian Office Action, Russian Application No. 2014102971/07(004560), Mar. 17, 2015, 11 pages.

(56) References Cited

OTHER PUBLICATIONS

Russian Office Action, Russian Application No. 2014118569/07(029296), Mar. 24, 2015, 12 pages.
Chinese Office Action, Chinese Application No. 201280036618.2, Nov. 25, 2014 16 pages.
Wu Xiaohua et al., "Analysis of the Principles of Undercover Software and Study on Operators' Countermeasures," Mobile Communications, Mar. 15, 2011, No. 5, 7 pages. (see office action).
European Supplementary Search Report for EP Application No. 12840210.4, Feb. 16, 2015, 6 pages.
European Extended Search Report, European Application No. 12791969.4, Dec. 12, 2014, 10 pages.
Office Action for Japanese Patent Application No. JP 2014-513643, Apr. 22, 2014, 4 Pages.
Patent Cooperation Treaty, International Search Report and Written Opinion, International Patent Application No. PCT/US2012/060102, Jan. 11, 2013, 14 pages.
Patent Cooperation Treaty, International Search Report and Written Opinion, International Patent Application No. PCT/US2012/039857, Aug. 27, 2012, 13 pages.
United States Office Action for U.S. Appl. No. 14/086,940, Feb. 13, 2014, 6 pages.
Office Action for U.S. Appl. No. 13/839,388, Aug. 26, 2015, 18 pages.
Office Action for Japanese Patent Application No. JP-2014-195295, Jun. 30, 2015, 4 pages.
Second Office Action for Chinese Patent Application No. CN 201280036618.2, Aug. 17, 2015, 27 Pages.
Patent Examination Report No. 1 for Australian Patent Application No. AU 2012323961, Sep. 30, 2015, 2 Pages.
Office Action for Australian Patent Application No. AU 2014236991, Dec. 21, 2015, 2 Pages.
Office Action for Chinese Patent Application No. CN 201280036618.2, Jan. 13, 2016, 13 pages (With Concise Explanation of Relevance).
Office Action for Japanese Patent Application No. JP 2014-195295, Dec. 8, 2015, 3 Pages.
Office Action for Japanese Patent Application No. JP 2014-519176, Apr. 12, 2016, 4 Pages.
Examination Report No. 1 for Australian Patent Application No. 2012275151, May 2, 2016, 3 Pages.
Examination Report No. 2 for Australian Patent Application No. 2012275151, Jul. 27, 2016, 4 Pages.
$3^{rd}$ Office Action for Chinese Patent Application No. CN 2012800395876, Mar. 8, 2016, 9 Pages.
$1^{st}$ Office Action for Chinese Patent Application No. CN 201280057427.4, Apr. 28, 2016, 21 Pages.
Office Action for Chinese Patent Application No. CN 201280036618.2, Jun. 3, 2016, 17 Pages.
Office Action for U.S. Appl. No. 13/539,050, Jun. 30, 2016, 12 Pages.
Office Action for Mexican Patent Application No. MX 15/013841, Mar. 8, 2016, 3 Pages.
Office Action for Canadian Patent Application No. CA 2,839,952, Sep. 12, 2016, 3 Pages.
Extended Search Report for European Patent Application No. EP 14769627.2, Nov. 4, 2016, 5 Pages.
Office Action for Japanese Patent Application No. JP 2014-535957, Oct. 4, 2016, 6 Pages.
Office Action for Chinese Patent Application No. CN 201280036618.2, Dec. 5, 2016, 9 Pages (With Concise Explanation of Relevance).
Office Action for Chinese Patent Application No. CN 201280057427.4, Feb. 27, 2017, 19 Pages.

* cited by examiner

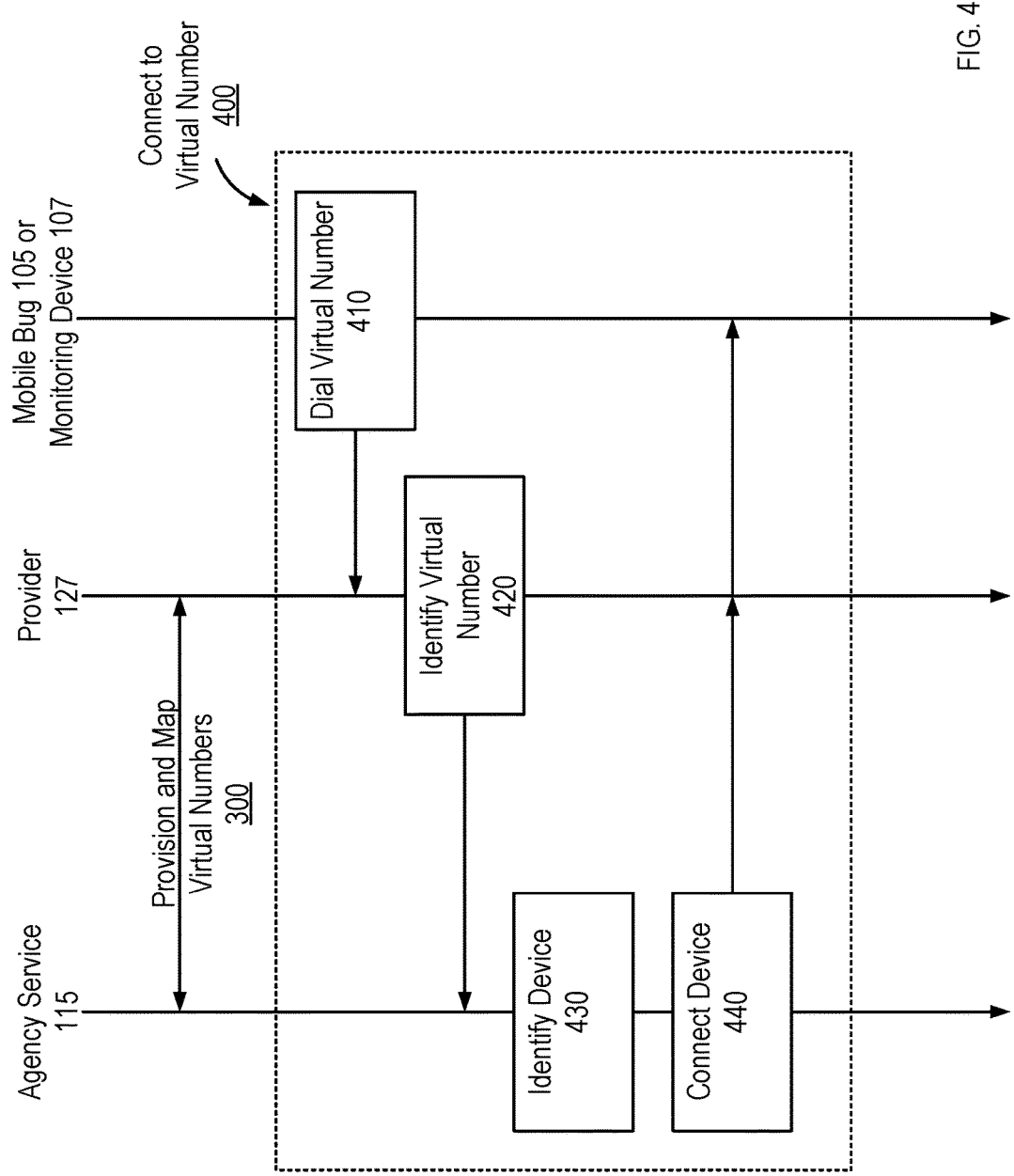

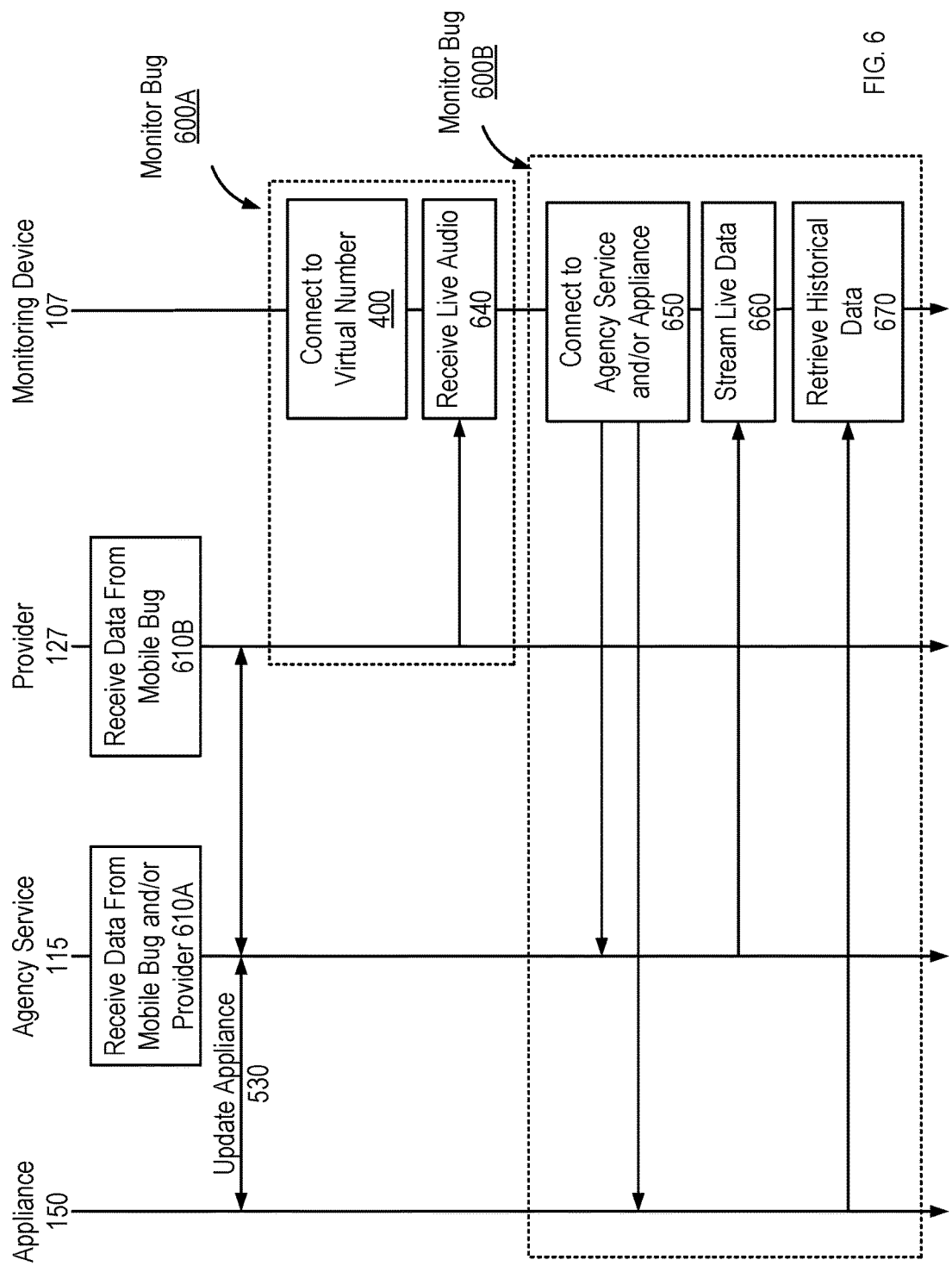

MOBILE PHONE AS A ONE-WAY RECORDED TRANSMITTER OVER A CELLULAR NETWORK

CROSS REFERENCE TO RELATED APPLICATIONS

This application is a continuation of co-pending U.S. application Ser. No. 14/537,628, filed on Nov. 10, 2014, which is a continuation of Ser. No. 14/086,940, filed on Nov. 21, 2013, now U.S. Pat. No. 8,934,847, issued Jan. 13, 2015, which is a continuation of U.S. application Ser. No. 13/482,966, filed on May 29, 2012, now U.S. Pat. No. 8,626,078, issued on Jan. 7, 2014, which claims the benefit of U.S. Provisional Application No. 61/491,823, filed May 31, 2011, and U.S. Provisional Application No. 61/549,657, filed Oct. 20, 2011, all of which are incorporated by reference herein in their entirety.

This application is related to U.S. application Ser. No. 13/539,050, filed Jun. 29, 2012, and U.S. application Ser. No. 13/631,621, filed Sep. 28, 2012, both of which are incorporated by reference herein in their entirety.

BACKGROUND

1. Field of Art

The present disclosure generally relates to the field of undercover operations and more specifically to using a mobile phone as an undercover device.

2. Background of the Invention

Police officers and other agents "operators" oftentimes conduct investigations in the field during the course of their duties. In many cases, these investigations require direct support and oversight at an administrative level. For example, an operator conducting an undercover sting in a high-risk situation may have a support team monitoring the operator directly in the field and interfacing with administration at an agency. Traditionally, the operator would use a radio-based covert listening system that can be hidden (e.g., under a shirt) or otherwise embedded (e.g., in or on an electronic device or object) to conceal its nature and protect operators' cover. The listening device would then transmit audio data back to the support team, which would relay data back to the agency.

However, with widespread publicity of listening devices in movies and the like, the physical nature of a given device can lead to its discovery or detection, which poses additional risks for the operators themselves. Additionally, traditional bugs have other inherent deficiencies when used in the field, such as requiring line-of-sight or physical proximity to a base station and the support team. Although some newer bug systems seek to provide sufficient concealability among other desirable features, they are oftentimes prohibitively expensive and yet, still fail to mitigate the above deficiencies. Furthermore, such systems are not rapidly deployable as they typically require support personnel other than immediate backup.

SUMMARY

The above and other issues are addressed by a method and computer system for configuring a telephonic device as a one-way recorded transmitter (mobile bug). An embodiment of the method comprises receiving information in response to a connection request from a telephonic device to a virtual number. The information received includes a transmitting number corresponding to the telephonic device and the virtual number. The telephonic device is identified as the mobile bug in response to matching the transmitting number of the telephonic device with a transmitting number stored in association with the virtual number in a mapping table. With the mobile bug identified, the method further includes transmitting instructions for connecting the mobile bug to the virtual number to permit monitoring of the mobile bug. Outgoing audio to the mobile bug is disabled.

An embodiment of the system comprises a server having a one or more processors and a non-transitory computer-readable storage medium storing computer program code. When executed, the computer program code causes the server to receive information in response to a connection request from a telephonic device to a virtual number. The information received includes a transmitting number corresponding to the telephonic device and the virtual number. The server identifies the telephonic device as the mobile bug in response to matching the transmitting number of the telephonic device with a transmitting number stored in association with the virtual number in a mapping table. With the mobile bug identified, the server transmits instructions for connecting the mobile bug to the virtual number with outgoing audio to the mobile bug disabled to permit monitoring of the mobile bug.

BRIEF DESCRIPTION OF THE DRAWINGS

The teachings of the embodiments can be readily understood by considering the following detailed description in conjunction with the accompanying drawings.

FIG. 4 is an interaction diagram illustrating a method for connecting a monitoring device or mobile bug to a virtual number according to one example embodiment.

FIG. 6 is an interaction diagram illustrating a method for monitoring a mobile bug according to one example embodiment.

DETAILED DESCRIPTION

Figure 1A:
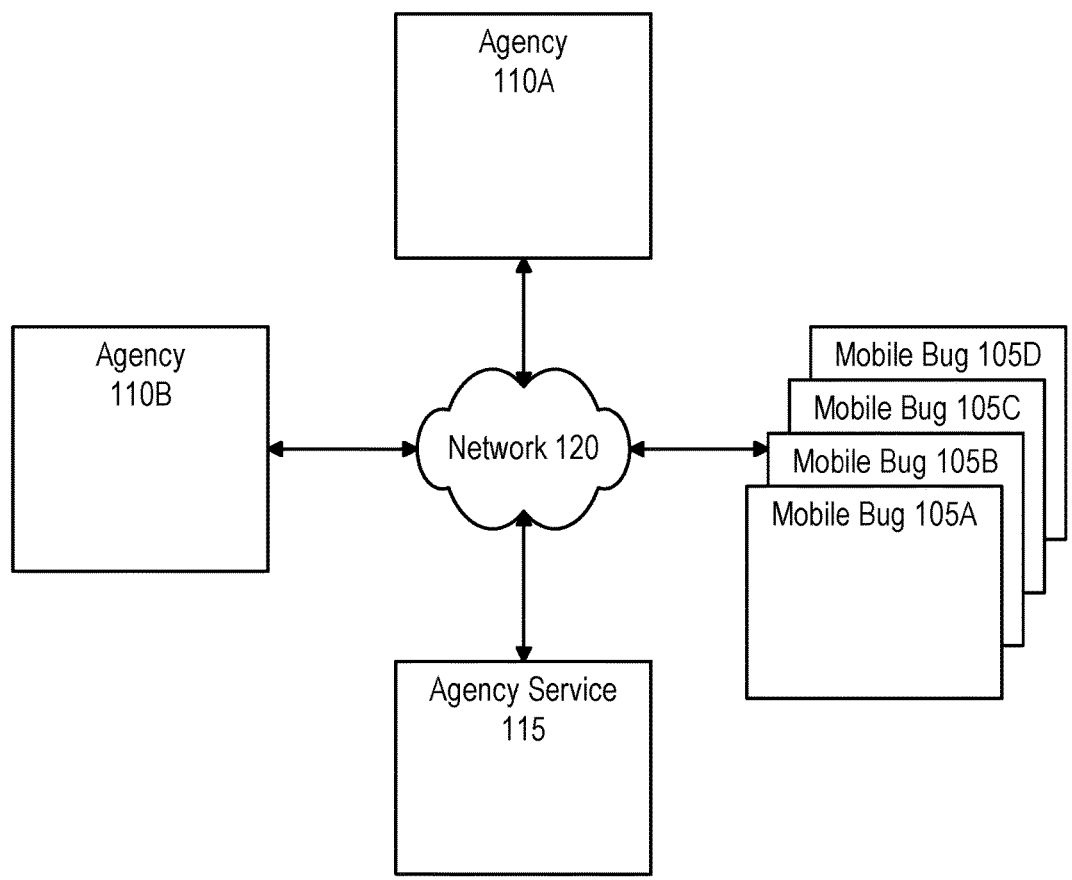
FIG. 1A is a block diagram illustrating an environment for implementing a system for using a mobile phone as a one-way recorded transmitter "mobile bug" according to one example embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

Many operators in the field posses a personal mobile phone or are issued a mobile phone by their agency or department. Oftentimes a traditional bug and accompanying support team are unavailable to support an operator in the field or are not appropriate for a given scenario. However, the agency may still desire to monitor and/or record the operator's activities. Accordingly, the agency may coordinate with an agency support service for configuring the operator's mobile phone to fulfill the role of a traditional bug. The configuration can take place over-the-air such that a given mobile phone is conveniently converted as needed. In some instances, the mobile phone requires nothing more than a radio connection and dialer. Additionally, if the agency desires to monitor additional operators, the agency can specify additional mobile phones for operation as bugs.

Example embodiments described herein relate to configuring a wireless radio network (e.g., Cellular Network and/or WiFi) capable device, such as a mobile phone, as a one-way recorded transmitter or "mobile bug" for use in the field. As mobile phones and similar devices are commonly carried by operators during the course of undercover investigations, mobile phones offer an existing platform for transmitting data wirelessly. Use of such devices as a mobile bug often allows the mobile bug to be concealed "in plain sight" as a direct result of the devices' popularity and utility. Additionally, with the popularity of smart phones and feature phones, additional monitoring and safety features are integrated into the mobile bug for enhancing operational viability in the field.

Furthermore, because a mobile phone configured as a mobile bug communicates information over existing channels created for the phone's intended purpose, the mobile bug, if examined, at worst appears to operate as expected (e.g., receives and/or transmits wireless data). Accordingly, the worst case scenario for an operator is having to "turn-off" the mobile bug rather than having their cover blown. Additionally, by turning a mobile phone into a covert transmitting device and using a cellular network as the means of transmission, the mobile bug system offers a virtually unlimited range of transmission and the ability to collect a wide range of valuable real-time data. Real-time data collected by the mobile bug may include audio, video or still images, Global Positioning System ("GPS") coordinates, etc.

The mobile bug subsequently transmits all or a portion of the collected real-time data wirelessly over the existing channels (e.g., a network) back to the agency, agency service or another entity. Embodiments of the agency, agency service and/or other entities within the mobile bug system receive the collected data for storage and/or live streaming to monitoring devices. Depending on the embodiment, the monitoring devices are further configured to access and present (e.g., play and/or display) a variety of the real-time and historical data stored on or streamed by the entities on the network. For example, the monitoring devices may access a web interface, API or execute a standalone application for viewing mobile bug details and the collected information. In some embodiments, the monitoring devices may access portions of the real-time data via a provided monitoring line configured for maintaining the operator's cover. Furthermore, other agencies with appropriate credentials and monitoring devices may similarly access portions of the collected information during inter-agency investigations.

Environment and Implementation of the Mobile Bug System

FIG. 1A is a block diagram illustrating an environment 100 for implementing a mobile bug 105 system according to one example embodiment. As shown the environment 100 includes a network 120 connecting agency 100A and 100B, an agency support service provider "agency service" 115 and mobile bugs 105A through 105D. While only one agency service 115 and two agencies 110 are shown in FIG. 1A for clarity, embodiments can have many agencies 110 and multiple agency service providers 115. Additionally, in some embodiments, the agency service 115 may be consolidated at an agency 110.

Agency service 115 represents a collection of compute devices (e.g., servers) and related storage mediums that are used to execute module for performing various activities such as configuring mobile bugs 105, exchanging data over the network 120 and storing data in support of one or more agencies 110A, 100B and operated mobile bugs 105. For example, the agency service 115 may include one or more modules providing ascribed functionality to an agency 110 via an application programming interface ("API") or web interface, collectively "the monitoring interface", as described in more detail with reference to FIG. 1B. The agency service 115 may also include infrastructure for providing audio and video communicability (e.g., internally and/or over the network 120) within the monitoring interface using the public switched telephone network ("PSTN"), voice over internet protocol ("VoIP") and video conferencing services.

Agency 110A and 110B represent collections of servers, desktop, notebook or tablet computers, mobile telephones and related storage mediums used by respective agency personnel for executing applications or modules to communicate with and receive data from the agency service 115 (e.g., via the monitoring interface) and other entities on the network 120. For example, agency 110 devices may execute a web browser to access a web interface or execute a mobile or desktop application for communicating with an API provided by the agency service 115. An agency 110A may also include telephonic and video infrastructure enabling audio and video communicability (e.g., internally and/or over the network 120) using the public switched telephone network ("PTSN"), voice over internet protocol ("VoIP") and video conferencing services for monitoring or specifying configurations for mobile bugs 105.

The mobile bugs 105 are oftentimes mobile telephonic devices capable of collecting data and transmitting data (e.g., wirelessly) over the network 120. Some examples of a mobile bug 105 include a mobile phone, tablet or notebook computer. Example embodiments of the mobile bug as a mobile phone include feature phones, smart phones or standard mobile phones. Accordingly, a given mobile phone or other device operated as a mobile bug 105 may not necessarily include or support all of the functionality ascribed herein to the mobile bug or mobile bug system due to inherent differences in device capabilities. In some embodiments, other telephonic devices such as land-line phones oare used.

In one embodiment, the mobile bug 105 executes a bug module for collecting data, transmitting data and maintaining a persistent connection with entities on the network 120. An example embodiment of a bug module is described in more detail with reference to FIG. 2.

In addition to the mobile bugs 105, a number of monitoring devices (not shown) may connect to entities on the network 120 to obtain or present data collected from one or more of the mobile bugs. Depending on the embodiment, a monitoring device is a telephonic device that can be operated within the agency 110 or externally in the field. As referred to herein, a monitoring device is a mobile or stationary telephonic device capable of connectivity (e.g., wireless or wired) to a network 120 such as an agency 110 network, the internet, PSTN and/or cellular network. Some examples of a monitoring device include a mobile phone, land-line phone, tablet and notebook or desktop computer.

Example embodiments of the monitoring device as a mobile phone can include feature phones, smart phones or standard mobile phones. Accordingly, a given mobile phone or other device operated as a monitoring device does not necessarily include or support all of the functionality ascribed herein to the monitoring device or the mobile bug system due to inherent differences in device capabilities. In one example embodiment, the monitoring device executes a monitoring module for interfacing with entities on the network 120 to manage mobile bugs 105 and view collected data.

The network 120 represents the communication pathway between agencies 110, agencies service 115, the mobile bugs 105, monitoring devices and other entities (not shown). In one embodiment, the network 120 includes standard communications technologies and/or protocols and can include the Internet and PSTN. Oftentimes, these communications technologies and/or protocols carry both PTSN and Internet related data. Thus, the network 120 can include links using technologies such as Ethernet, 802.11, worldwide interoperability for microwave access (WiMAX), 2G/3G/4G mobile communications protocols, worldwide interoperability for PSTN communications, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including analog audio (e.g., for last mile PSTN communications), digital audio and video (e.g., as a file or streaming with Real Time Streaming Protocol), the hypertext markup language (HTML), the extensible markup language (XML), JavaScript, VBScript, FLASH, the portable document format (PDF), etc. In addition, all or some of the data exchanged over the network 120 can be encrypted using conventional encryption technologies such as secure sockets layer (SSL), transport layer security (TLS), virtual private networks (VPNs), Internet Protocol security (IPsec), etc. In another embodiment, the entities on the network 120 can use custom and/or dedicated data communications technologies instead of, or in addition to, the ones described above. For example, some government agencies and the military may operate networks auxiliary to the internet and PSTN.

As used herein, the term "module" refers to computer program instructions and/or other logic used to provide the specified functionality. Thus, a module can be implemented in hardware, firmware, and/or software. In one embodiment, program modules formed of executable computer program instructions are stored on a non-transitory storage device, loaded into memory, and executed by a computer processor as one or more processes.

Figure 1B:
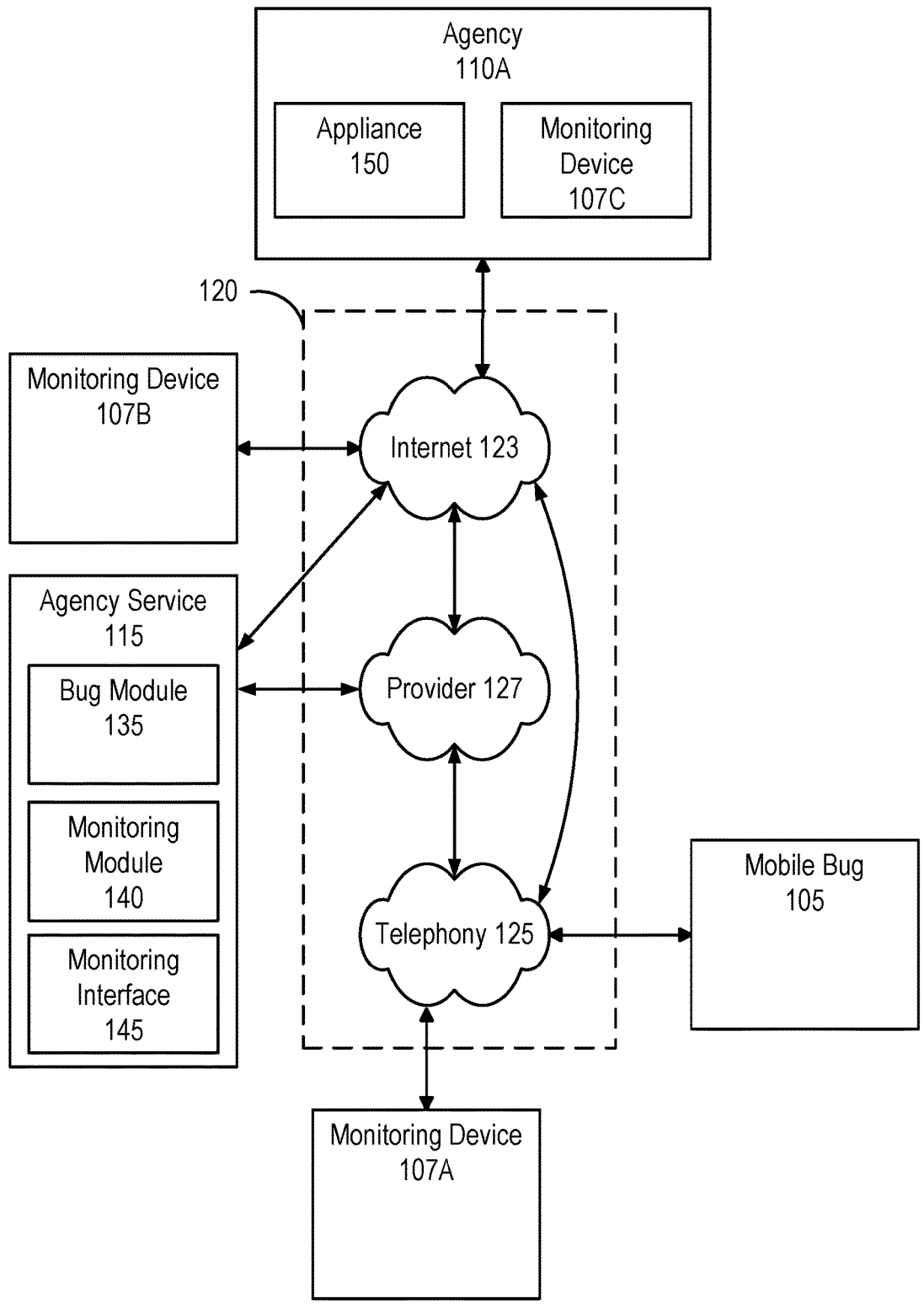
FIG. 1B is a block diagram illustrating an operating environment of a mobile bug according to one example embodiment.

FIG. 1B is a block diagram illustrating an operating environment 101 of a mobile bug 105 according to one example embodiment. As shown, the operating environment 101 includes a network 120 with components such as the internet 123, telephony 125 and provider 127. The network 120 may also include GPS satellites (not shown) that relay position data to mobile bugs 105 and other devices.

The telephony network 125 may include servers, switches and other hardware and software for implementing, among other protocols and technologies, worldwide interoperability for PSTN communications including land-lines and 2G/3G/4G wireless protocols. The telephony network 125 also provides mobile devices with the capability to transmit and receive data over the internet 123. The telephony network 125 is managed by one or more communication service providers "CSPs" (not shown) that own telephone numbers for use on the PSTN and the CSPs own network (e.g., a wireless network that communicates with the PSTN).

The provider 127 may include servers, switches and other hardware and software for communicating over the network 120 with CSPs and other entities. The provider 127 buys or leases numbers for use on the telephony network 125 from multiple CSPs. The provider 127, in turn, manages numbers provisioned for use by the agency service 115 and the telephony traffic associated with the numbers. In one embodiment, the provider 127 allows the agency service 115 to provision one or more of the numbers as virtual numbers over the network 120.

Typically, a number used on the telephony 125 network directs to a given mobile device, VoIP device or land-line device having an associated number identity characterized by automatic number identification "ANI" information, or caller identification. Virtual numbers, while still operable with the PSTN and CSP networks, are associated with the provider 127 who handles telephony traffic for the number. Because a virtual number does not direct to an end user device, the provider 127 may establish connections with devices dialing the virtual number, record call information such as call audio and caller history (e.g., on a computer readable medium) and stream/provide call information for download (e.g., over the network 120).

The provider 127 may also pass/bridge audio (bidirectional or unidirectional) in real-time between two or more telephonic devices establishing connections with the same or different virtual numbers (or connected with the provider 127 via a virtual number). Additionally, as the virtual numbers are handled by the provider 127, the agency service 115 may modify ANI information and caller identification associated with the virtual number.

In addition to provisioning virtual numbers for the agency service 115, the provider 127 communicates notifications and data associated with the virtual numbers to the agency service 115 or other entity such as the agency 110A. For example, the provider 127 may notify the agency service 115 of an incoming caller to the virtual number and receive instructions from the agency service 115 to connect the caller to the virtual number. The provider 127 may also receive instructions to stop/start recordings of calls placed to the virtual number and interface with a transcription service to transcribe call audio. In turn, the provider 127 can transmit the recordings and transcripts to the agency service 115 or other entity on the network 120.

Additionally, the provider 127 may enable or disable inbound and/or outbound audio for different parties connected to the virtual number and recordings thereof responsive to instructions received (e.g., via an API) from the agency service 115. The provider 127 can receive instructions for managing a virtual number as part of the provisioning process, prior to an incoming call or in real-time from the agency service 115 when connecting an incoming caller to the virtual number. In some embodiments, the provider 127 communicates directly with the agency 110A to provision virtual numbers, transmit notifications and data or receive instructions. Additionally, the provider 127 itself may function as a CSP and vice versa.

The agency service 115 receives requests for provisioning and mapping virtual number from the agency 110A, mobile bug 105 or other monitoring device 107. The requests can include number information for provisioning virtual numbers such as an area code (e.g., 555), country code (e.g., +44) and/or associated CSP. In turn, the agency service 115 queries the provider 127 for available virtual numbers matching the request and returns the matching virtual numbers to the requesting entity. The agency service 115 subsequently receives a selection of virtual numbers from the requesting entity and claims the virtual numbers from the provider 127. The agency service 115 may optionally allow the entity to specify ANI and/or caller identification associated with the virtual number to spoof the number's identity on the network 120. The agency service 115, in turn, transmits instructions to the provider 127 for modifying the number identity. The agency service 115 may optionally verify the spoofed number identity. When a virtual number is no longer needed by the agency 110A, the agency service 115 obtains any audio recordings or call logs associated with the virtual number and releases the number back to the provider 127.

The requests can also include mapping information for configuring claimed virtual number function in a mapping table. Depending on the desired configuration, the mapping information may include the transmitting number of a mobile bug 105 and/or and monitoring device 107, virtual number for association with the device and/or desired function of the virtual number (e.g., monitoring number or receiving number). One example mapping request may specify a claimed virtual number for use as a virtual receiving number (receiving number) that mobile bugs 105 connect to in order to transmit collected data (e.g., audio) over the telephony 125 network. In one embodiment, the request includes the transmitting number of the mobile bug 105 and a given claimed virtual number for configuration as the receiving number. In response to the request, the agency service 115 associates the transmitting number of the mobile bug 105 with the receiving number and stores the association in a mapping table.

Another example mapping request may specify a claimed virtual number for use as a virtual monitoring number (monitoring number) that monitoring devices 107 connect to in order to monitor a receiving number (e.g., listen to audio a mobile bug 105 transmits to the receiving number). In one embodiment, the request includes a given claimed virtual number (e.g., the monitoring number) and the receiving number. In response to the request, the agency service 115 associates the receiving number with the monitoring number and stores the association in a mapping table.

In some embodiments, a mapping request may optionally include the transmitting number of a monitoring device 107 which the agency service 115 associates with a receiving number or monitoring number to identify the monitoring device. As multiple monitoring devices 107A, 107B, 107C may monitor a mobile bug 105, the agency service 115 may store multiple transmitting numbers of monitoring devices in association with a receiving number or monitoring number in a mapping table.

In practice, agency service 115 consults the mapping table to automatically identify a device connecting to a virtual number (e.g., the receiving number) as either the mobile bug 105 or a monitoring device 107 based on the device's transmitting number. Thus, for example, an operator of a mobile bug 105 may simply dial the receiving number mapped to the transmitting number of his phone to activate the mobile bug.

Personnel with a monitoring device 107 that desire to monitor the mobile bug 105 with a mobile or land-line phone at the agency 110A or in the field can also dial the receiving number. However, as the agency 115 does not identify the transmitting number of the device that of the mobile bug 105, personnel devices are appropriately identified as monitoring devices 107. In some embodiments, the agency service 115 identifies connecting monitoring device 107 based on a mapping of monitoring devices' 107 transmitting numbers to the receiving number.

Additionally, embodiments of the agency service 115 can use the mapping of monitoring devices 107 to the receiving number for instructing the provider 127 to automatically dial (e.g., from a specified monitoring number) or otherwise notify (e.g., a text message or email) monitoring devices when the mobile bug 105 connects to the receiving number. The agency service 115 may also notify monitoring devices 107 through the monitoring interface 145 or via text massage or email.

To prohibit unauthorized access to receiving numbers (and monitoring numbers), the agency service 115 may allow personnel and operators to specify key-ins when provisioning and/or mapping virtual numbers. The agency service 115 stores the key-ins in the mapping table or other suitable database structure and authenticates callers attempting connections to the virtual numbers responsive to correct key-ins. In instances where the agency service 115 instructs the provider 127 to automatically dial a monitoring device 107 from a virtual number, the provider 127 may initially connect the call without outbound audio (if the device answers) and then wait (or prompt) for a key-in. In response to authentication of the key-in, the provider 127 enables outbound audio to the dialed monitoring device 107. Depending on the embodiment, the agency 110A, agency service 115 or provider 127 may store the mapping table and/or key-ins for device identification and authentication.

In some embodiments, the agency service 115 provides a bug module 135 to the mobile bug 105. The bug module 135 interfaces with the native dialer of the mobile bug 105 to maintain a persistent connection with a selected virtual number such as the receiving number. Additionally, the bug module 135 may interface with mobile bug 105 software and/or hardware to utilize features such as an image capture device and GPS to collect real-time image or video and position data. The bug module 135 transmits the collected data over the network 120 back to the agency service 115 or other entity. The agency service 115, in turn, may store the collected data for transmission to one or more monitoring devices 107 and the agency 110A. Furthermore, the bug module 135 may be configured with a password or otherwise disguised when executed to prevent users other than the operator from accessing the module altogether and/or particular features that would give away its true nature. The bug module 135 is described in more detail with reference to FIG. 2.

In some embodiments, the agency service 115 includes a monitoring interface 145 for providing data received from mobile bugs 105 to various monitoring devices 107 and/or appliances 150 over the network 120. For example, the monitoring interface 145 may provide monitoring devices 107 with data corresponding to the status (e.g., transmitting or disconnected) of one or more mobile bugs 105. If the mobile bug 105 is transmitting real-time data, the monitoring interface 145 can stream data such as audio from the active transmission, GPS coordinates with heading, speed and coordinates of last-reported locations for placement on a map, collected image or video data, and the internet protocol address and/or telephone numbers of other personnel monitoring or having access to the mobile bug. In some embodiments, the monitoring interface 145 syncs collected data prior to transmission or includes tags in the transmitted data for synchronization of playback at the monitoring device 107. The monitoring interface 145 can also stream, or provide for download, previously recorded monitoring sessions.

In some embodiments, the agency service 115 provides a monitoring module 140 to monitoring devices 107 for accessing the monitoring interface 145. The monitoring module 140 transmits requests associated with configuring a mobile bug 105 and receiving real-time data collected by monitored bugs. For example, the monitoring module 140 may provide a user interface or status dashboard with options for provisioning virtual numbers, mapping a transmitting number of a mobile bug 105 or monitoring device 107 to a given virtual number and assigning key-ins for connecting to the virtual number. In one embodiment, the dashboard provides an option to toggle a recording session on or off with the agency service 115. When the recording session is disabled, the monitoring device 105 still receives real-time data, but the agency service 115, appliance 150 and provider 127 do not store copied of the collected data.

The monitoring module 140 may also display real-time status information for the mobile bug 105 including current GPS location, tracked GPS location, live audio and image data, mapping table information and other information collected from the mobile bug and streamed by the monitoring interface 145. Similarly, the monitoring module 140 may be used to access and playback historic activity associated with a given virtual number or mobile bug 105. For example, the monitoring module 140 may download files for playback or steam them. In addition to interfacing with the agency service 115, the monitoring module 140 may interface with an appliance 150 that stores (or backs up) collected data within the agency 110A. Additionally, the monitoring module 140 may include functionality of the bug module 135 and vice versa.

In one embodiment, the agency 110A includes an appliance 150 for storing data collected by mobile bugs 105. The appliance 150 may utilize the monitoring interface 145 provided by the agency service 115 for updating stored data or receive data directly from mobile bugs 105. Additionally, the appliance 150 may receive audio recorded on a virtual number and associated transcripts from the provider 127 or agency service 115. One example embodiment of the appliance 150 also includes its own monitoring interface (not shown) that enables monitoring devices 107 to access real-time and historic data stored on the appliance for the mobile bug 105. Monitoring interfaces provided by the agency service 115 or appliance 150 may also be accessible via a web browser for streaming or downloading data and include the same or similar options.

Additionally, the appliance 150 and agency service 115 may communicate to intermittently update collected data and records at defined intervals or in response to notifications to download data. During the intervals or notification periods, the agency service 115 may process the data and perform any necessary actions as desired by mobile bugs 105 or monitoring device 107 until the data is transferred to the appliance 150. In some embodiments, the agency service 115 maintains a persistent connection with the appliance 150 to facilitate transfer of real-time data collected by mobile bugs 105 operated in the field.

In one embodiment, the agency service 115 insures that it, and the provider 127, do not possess data collected by mobile bugs 105 beyond the time needed to facilitate transfer. However, in mission critical situations, operators and other agency 110A personnel cannot rely only on the availability of the appliance 150 for storing and maintaining collected data. Consequently, if the appliance 150 is unable to take possession of the collected data or go offline during transfer, the agency service 115 and/or the provider 127 may maintain possession of the collected data until the appliance 150 is functioning. Furthermore, the agency service 115 and/or provider 127 may determine whether checksums, hashes or sizes of transferred data match the appliance's 150 version prior to deleting stored data.

In some embodiments, the agency service 115 maintains an appliance instead of, or in addition to, the agency 110A. In such cases, the appliance may exist as a dedicated piece of hardware or remote storage. Alternatively, embodiments of the appliance 150 may be implemented in a cloud computing and storage stack available on the network 120.

Mobile Bug Functionality

Figure 2:
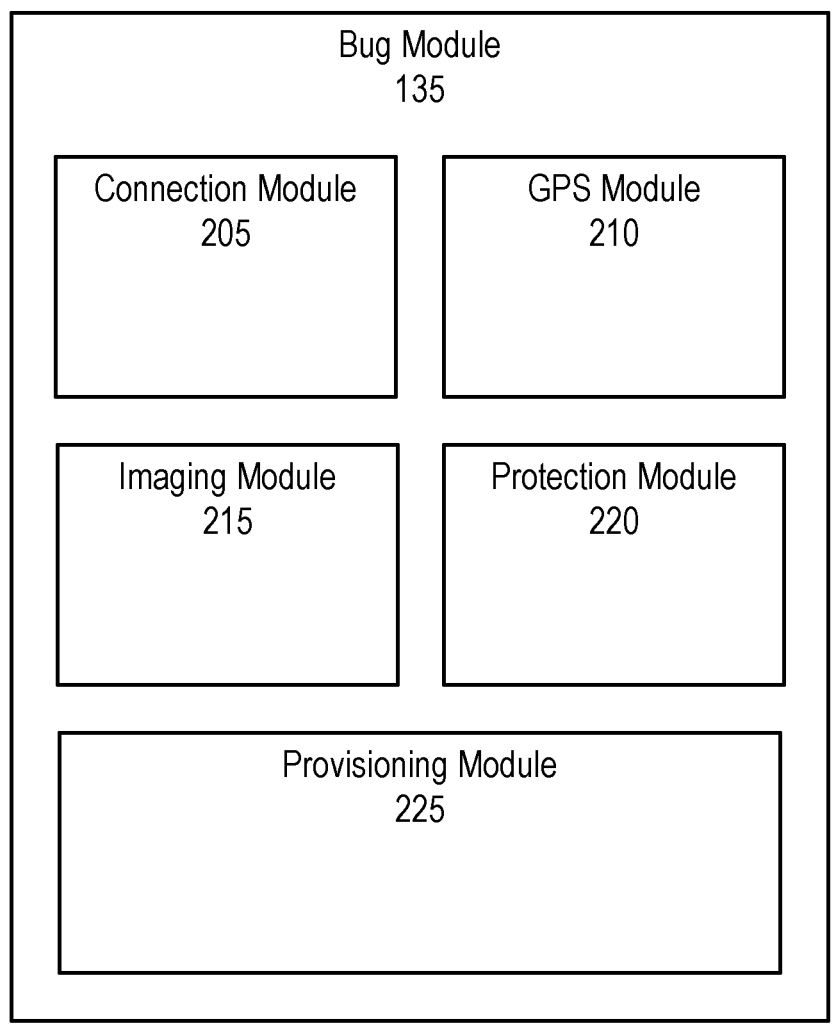
FIG. 2 is a block diagram illustrating a bug module according to one example embodiment.

FIG. 2 is a block diagram illustrating a bug module 135 according to one example embodiment. As mentioned above, the bug module 135 may be downloaded from the agency service 115 to the mobile bug 105 and executed to collect and transmit data to entities on the network 120. As shown in FIG. 2, the bug module 135 itself includes multiple modules. In the embodiment shown in FIG. 2, the bug module 135 includes a connection module 205, GPS module 210, imaging module 215, protection module 220 and provisioning module 225. In some embodiments, the functions are distributed among the modules in a different manner than described herein. Other embodiments have additional and/or other modules.

The connection module 205 maintains a persistent connection between the mobile bug 105 and a virtual number such as the receiving number mapped to the transmitting number of the mobile bug 105. For example, the operator may move into an area without network 120 service and unknowingly disconnect the mobile bug 105 from the receiving number or otherwise prevent successful transfer of data to an entity on the network. The connection module 205 receives input from the operator including the receiving number associated with the mobile bug 105. Once a connection with the receiving number is established, the connection module 205 detects network 120 disruptions such as dropped calls, timeouts or packet loss and automatically reestablishes connection with the receiving number or retries transmission of collected data over the network.

In one embodiment, the connection module 205 communicates with a native dialer of the mobile bug 106 to redial the receiving number and reestablish the connection without intervention from the operator. When the operator desires to terminate transmission, the connection module 205 may receive input from a designated disconnect button to terminate the call and stop the auto-redialing process.

Depending on the mobile bug's 105 capabilities, the communication module 205 may enable placement/receipt of outgoing and incoming calls (e.g., other than those placed within the module to the receiving number) during monitoring (e.g., via call waiting features) within the native dialer application or similar. Embodiments of the communication module 205 and/or protection module 220 may suppress visual notifications or queues that the communication module 205 is maintaining a connection with the receiving number. In some instances, the communication module 205 can pass audio from the inbound or outbound call to the call-waiting connection with the receiving number to prevent gaps in audio monitoring.

The GPS module 210 communicates with a native GPS receiver on the mobile bug 105 to receive GPS location data. The GPS module 210 may also communicate with other radio receivers and directional mechanisms (e.g., compass or accelerometers) on the mobile bug 105 to receive additional location data. The GPS module 210 processes the GPS and radio location data to determine and refine an estimated location measurement for the mobile bug 105. The location measurement may include, but is not limited to, a latitude, longitude, altitude, heading, speed, associated accuracy measurement and the time and date of recording. The GPS module 210 transmits the determined location measurement over the network 120 the agency service 115 or other entity. In one embodiment, the GPS module 210 streams the location measurement in real-time.

The imaging module 215 communicates with a native image sensor on the mobile bug 105 for capturing still images or videos. The imaging module 215 may down-sample (e.g., compress) collected image data for transmission over the network 120 based on available bandwidth. Thus, for example, the imaging module 215 may stream the collected image data in real-time. High-resolution image data may be stored directly on the device for subsequent transmission as bandwidth becomes available.

In some embodiments, a protection module 220 interfaces with the operating system of the mobile bug 105 to provide options or functionality for concealing operations of the bug module 135 on the mobile bug 105. For example, the protection module 220 provides operators with option to run the bug module 135 in the background and only reveal or access the bug module in response to a specified key-in (e.g., button-press combination, password or other personal identification). In another example, the protection module 220 mimics the look and feel of the native operating system or calling application on the phone to conceal use of bug module 135 functionality. However, unlike the native operating system or calling application, the protection module 220 provides password protection, locking (e.g., with a key-in) or otherwise visually concealed or protected configuration options and viewing of current call activity for connections established using the communications module 205.

The provisioning module 225 interfaces with the provider 127 or agency services 115 to provision virtual numbers and modify virtual number assignments and function in the field. Alternatively, a web browser on the mobile bug 105 may be used.

In some embodiments, the bug module 135 and the modules therein interface and communicate with non-native devices attached to the mobile bug 105. For example, audio, images and locations data can be determined from accessories coupled (e.g., wired microphone or imaging device) or wirelessly connected (e.g., Bluetooth headset) to the mobile bug 105.

Virtual Number Provisioning

Figure 3A:
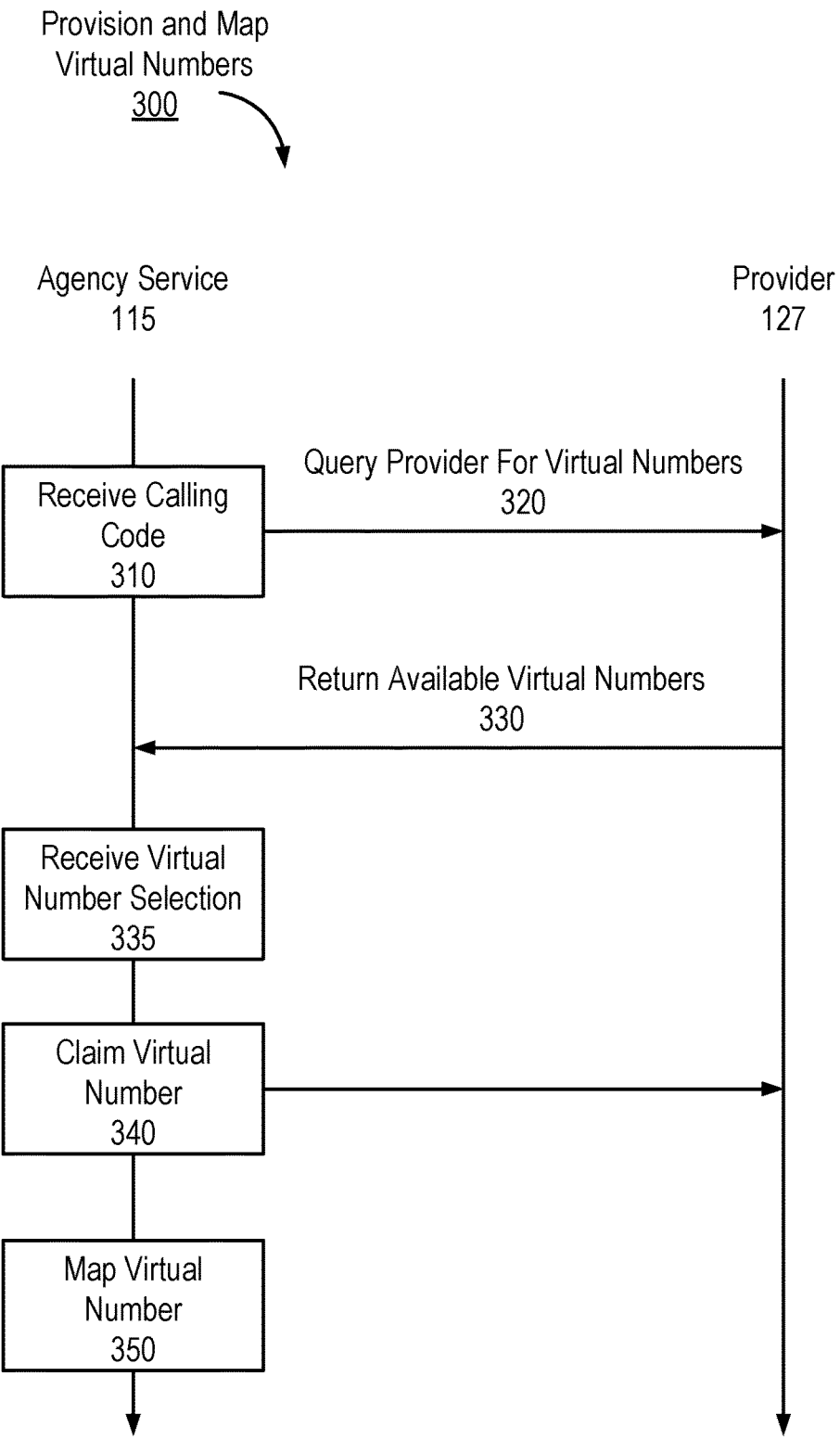
FIG. 3A is an interaction diagram illustrating a method for provisioning and mapping virtual numbers for operating and monitoring a mobile bug according to one example embodiment.

FIG. 3A is an interaction diagram illustrating a method for provisioning 300 and mapping virtual numbers for operating and monitoring a mobile bug 105 according to one example embodiment. Initially, the agency service 115 receives 310 a request including a calling code for provisioning 300 a virtual number from a monitoring device 107, mobile bug 105, provided web interface or other entity. The calling code can include an area code and country code where the provisioned virtual number will be operated.

The agency service 115 queries 320 the provider for virtual numbers matching the specified calling code. The provider 127 returns 330 a list of available virtual numbers to the agency service 115 which, in turn, transmits the virtual numbers for display to the requestor. The agency service 115 receives 335 one or more virtual number selections and claims 340 each selected virtual number from the provider 127. The agency service 115 may optionally include corresponding ANI and caller identification information for a virtual number that may be edited on the requesting device 105, 107 or in the web interface. The agency service 115 subsequently stores the modified virtual number information and instructs the provider 127 to update the associated virtual number information.

With one or more virtual numbers claimed, the agency service 115 can receive mapping requests for the virtual numbers and, in turn, map 350 the virtual numbers responsive to information in the mapping request. For example, the requestor may be prompted to enter the transmitting number of a mobile bug 105 for association with a virtual number to be used as a receiving number. The agency service 115 stores the transmitting number of the mobile bug 105 and the receiving number in a mapping table (e.g., at the agency service 115 or on the appliance 150). The requestor may modify the mapping at any time, without any interruption of service at the receiving number.

Oftentimes, receiving numbers have a different country code (or area code) than monitoring devices 107 connecting to the receiving number to monitor the mobile bug 105. In some cases, the requestor knows the country code or area code where the monitoring devices 107 are located. Accordingly, to avoid costly charges for the agency 110A, the agency service 115 allows the requestor to provision additional virtual numbers with the known country codes and area codes for use as monitoring numbers. The agency service 115 may then receive mapping requests for the monitoring numbers and, in turn map monitoring numbers to specified receiving numbers.

When a monitoring device 107 subsequently dials a monitoring number, the agency service 115 identifies the associated receiving number from the mapping table and instructs the provider 127 to connect the monitoring device 107 to the receiving number or pass audio from the receiving number to the monitoring number and connect the monitoring device to the monitoring number.

In some embodiments, monitoring numbers can be tied to the transmitting number of a mobile bug 105 for automatic mapping to receiving numbers. For example, an operator using the same mobile bug 105 for multiple investigations may utilize a different receiving number for each investigation (e.g., to keep distinct records). Rather than requiring the operator or personnel monitoring the operator to assign monitoring numbers (or frequently modify mapping) to each receiving number on an individual basis, a monitoring number can be tied to the mobile bug 105. When the mobile bug 105 is mapped or used with a receiving number, the agency service 115 maps the tied monitoring number to the receiving number. In such a way, a given monitoring number may be dedicated to monitoring a particular mobile bug 105. A requestor may re-specify the mapping configuration as needed to change or swap claimed virtual numbers and transmitting numbers between receiving numbers and monitoring numbers.

Example embodiments of monitoring device 107 mapping to receiving numbers and/or monitoring numbers can be performed in the same or similar fashion as mobile bug 105 mappings.

Figure 3B:
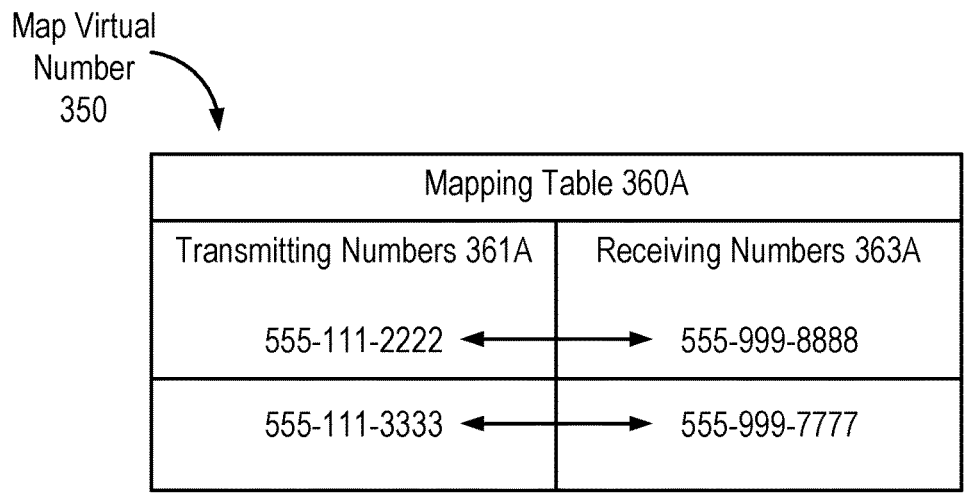
FIGS. 3B and 3C are tables illustrating example embodiments of virtual number mapping for operating and monitoring a mobile bug.

FIG. 3B is a table illustrating an example embodiment of virtual number mapping 350 for operating and monitoring a mobile bug 105. As shown, mapping table 360A includes a number of receiving numbers 363A mapped to corresponding transmitting numbers 361A (e.g., of mobile bugs 105).

When the agency service 115 receives connection requests to receiving numbers 363A from the network 120, the agency service identifies the connecting device as the mobile bug 105 based on the transmitting number 361A stored in the mapping table 360A. If the connecting device's number does not match the transmitting number 361A, the agency service 115 identifies the device as a monitoring device 107.

Prior to connecting the monitoring device 107 to the receiving number, the agency service 115 may wait or instruct the provider 127 to wait for key-in of a specified password. If an improper password or no password is received, the monitoring device 107 is disconnected. In one embodiment, the monitoring device 107 must enter the password within a given time period (e.g., 10-30 seconds) without being prompted to mitigate suspicion if the line is dialed by another party. In some embodiments, the mapping table 360A further includes mappings of monitoring device 107 transmitting numbers to explicitly identify monitoring devices in addition to mobile bugs 105.

Figure 3C:
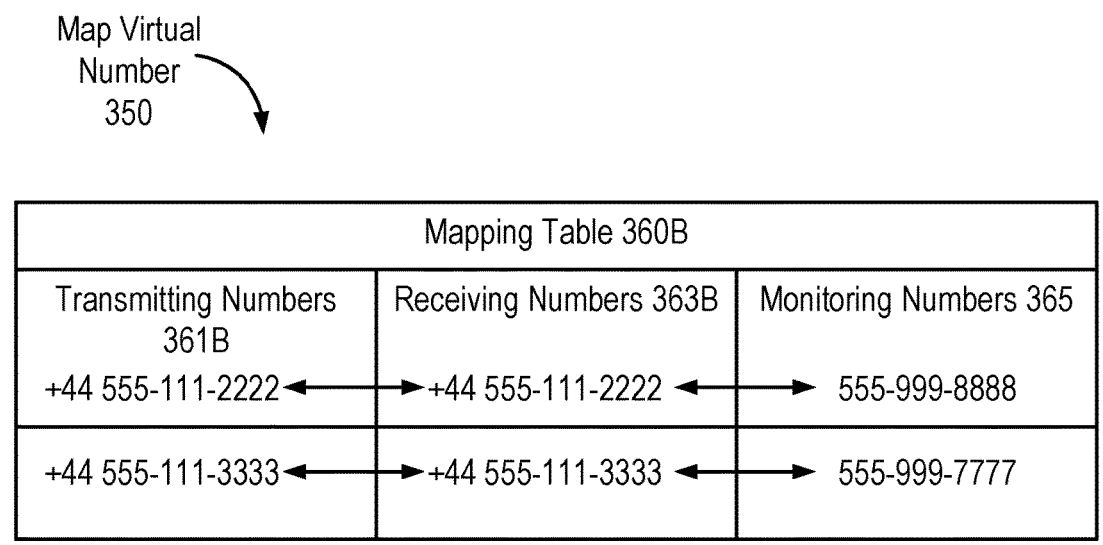

FIG. 3C is a table illustrating an example embodiment of virtual number mapping 350 for operating and monitoring a mobile bug 105. As shown, mapping table 360B includes a number of receiving numbers 363B mapped to corresponding transmitting numbers 361B (e.g., of mobile bugs 105). Additionally shown are a number of monitoring numbers 365 mapped to the receiving numbers 363B.

When the agency service 115 receives connection requests to monitoring numbers 365 from the network 120, the agency service automatically identifies the connecting device as a monitoring device 107 and identifies the associated receiving number 363B from the mapping table 360B. The agency service 115, in turn, instructs the provider 127 to connect the monitoring device 107 with the receiving number 363B (e.g., directly, or through the monitoring number 365). Prior to connecting the monitoring device 107, key-in of a specified password may be required. In some embodiments, the mapping table 360A further includes mappings of monitoring device 107 transmitting numbers to explicitly identify monitoring devices in addition to mobile bugs 105.

FIG. 4 is an interaction diagram illustrating a method for connecting 400 a monitoring device 107 or mobile bug 105 to a virtual number according to one example embodiment. Once the agency service 115 provisions 300 a virtual number with the provider 127, a mobile bug 105 or monitoring device 107 may connect 400 to the virtual number. To activate a mobile bug 105 the operator may simply dial 410 the receiving number mapped to his mobile phone. Similarly, personnel using a monitoring device 107 may dial 410 the receiving number mapped to the mobile bug 105 to monitor the bug. Alternatively, personnel using a monitoring device 107 may dial 410 the monitoring number mapped to the receiving number.

The provider 127 receives the connection request via the telephony network 125 and identifies 420 the dialed number as a virtual number provisioned 300 by agency service 115. Accordingly, in embodiments where the agency service 115 stores the mapping table, the provider 127 passes the transmitting number of the device attempting to connect to the virtual number to the agency service 115.

The agency service 115, in turn, identifies 430 the device attempting to connect to the virtual number as either the mobile bug 105 or a monitoring device 107 from the mapping table. In the case of the mobile bug 105, the agency service 115 determines that the transmitting number stored in the mapping table for the dialed receiving number matches the number of device attempting to connect to the receiving number. The agency service 115 then instructs the provider 127 to connect 440 the device to the receiving number as the mobile bug 105 and disable (e.g., mute) outgoing audio to the mobile bug.

In one embodiment, the agency service 115 identifies 430 devices with numbers that do not match the transmitting number stored in the mapping table for a receiving number as monitoring devices 107. The agency service 115 then instructs the provider 127 to connect 440 the device to the receiving number as a monitoring device 107.

If the agency service 115 determines that the device is attempting to connect to a monitoring number, the agency service 115 identifies 430 the device as a monitoring device 107. The agency service 115 then determines which receiving number the monitoring number is mapped to and instructs the provider 127 to connect 440 the device to the receiving number (e.g., directly or via the monitoring number) as a monitoring device 107.

The monitoring devices 107 may communicate with other devices monitoring the mobile bug 105 (e.g., like a conference call between the receiving number and/or monitoring numbers) although no audio is transmitted to the mobile bug. Additionally, the provider 127 or agency service 115 may provide the monitoring devices 107A with key combinations (e.g., *1, 2, etc.) to mute other monitoring devices 107, the mobile bug 105 or their own device.

In some embodiments, the PSTN or provider 127 fails to pass the transmitting number associated with a mobile bug 105 (or monitoring device 107) to the provider or agency service 115. For example, the provider 127 or agency service 115 may receive a number other than the mobile bug's 105 and incorrectly identify the mobile bug. Some example PSTN and provider 127 failures are all zeroes numbers (+00 000-000-0000), restricted numbers (737-874-2833) or simply an incorrect number for the mobile bug 105. In any instance, the agency service 115 may be unable to identify the mobile bug 105 by the received transmitting number.

The agency service 115 can recognize that some numbers are passed incorrectly (e.g., a restricted number or zeroes number). In response, the agency service 115 may play a prompt or instruct the provider 127 to play a prompt such as "press 1 for a mobile bug or press 2 for a monitoring device." In practice, the prompt can be ambiguous (e.g., please enter the extension of the party you are trying to reach or similar) for the safety of the operator if another party dials the virtual number. Operators or personnel may then key-in as using a mobile bug 105 or monitoring device 107.

Alternatively, as the key-ins of the mobile bug 105 and monitoring device 107 typically differ, the agency service 115 may instruct the provider 127 to simply play a generic tone or number not available recording to notify users that they need to key-in. The matching of a key-in with stored authentication information identifies and activates the connecting device as the mobile bug 105 (or monitoring device 107).

In some embodiments, the agency service 115 may prompt all connecting device to key-in for identification. For example, an agency 110A may want to enable the option to use unmapped devices as mobile bugs 105 on a specified receiving number.

Operating a Mobile Bug

Figure 5:
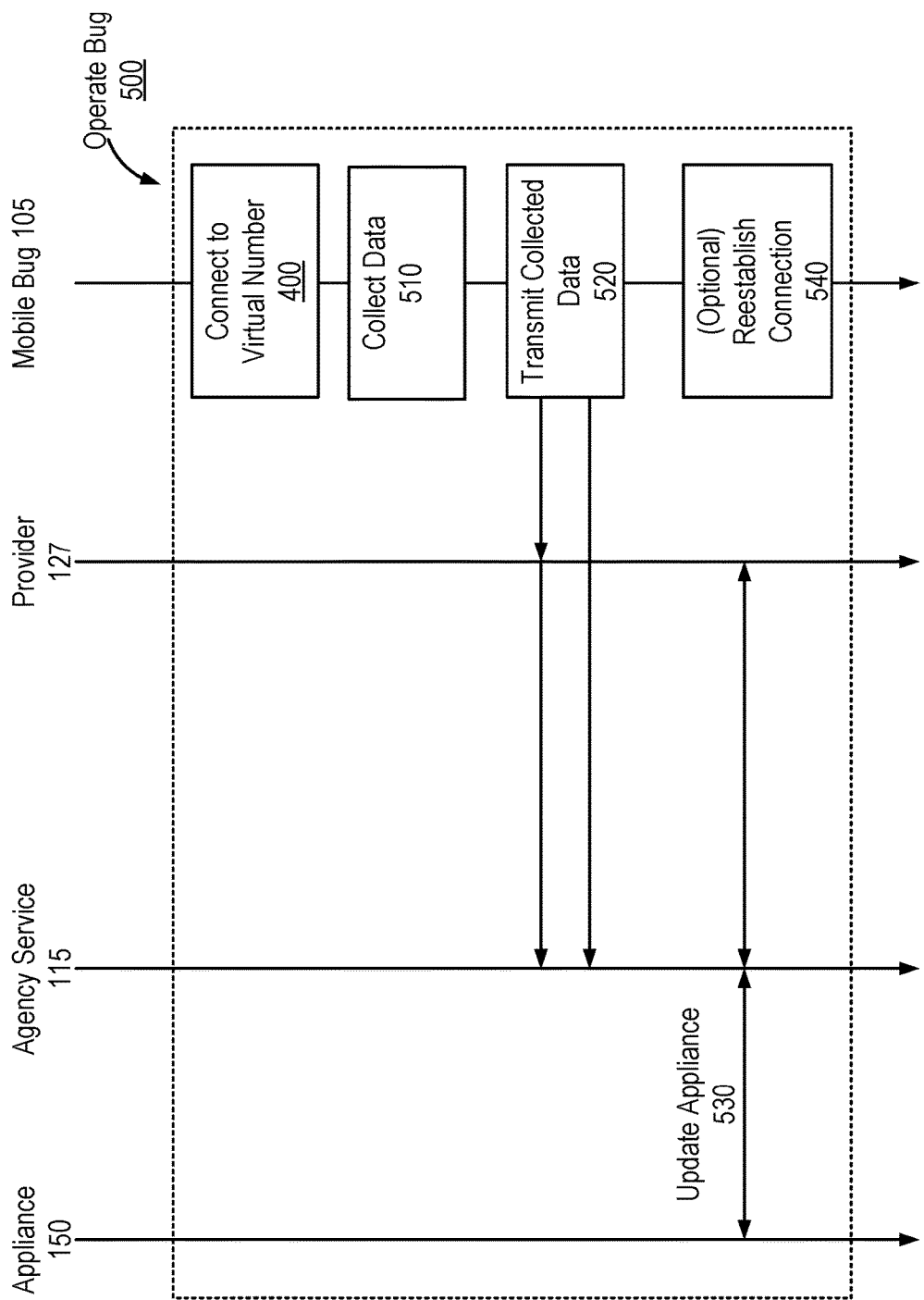
FIG. 5 is an interaction diagram illustrating a method for operating a mobile bug according to one example embodiment.

FIG. 5 is an interaction diagram illustrating a method for operating 500 a mobile bug 105 according to one example embodiment. Once the connection 400 between the mobile bug 105 and the receiving number is established, the provider 127 records audio on the line from the mobile bug.

The mobile bug 105 collects 510 audio data using a microphone coupled to the mobile bug. The mobile bug 105, in turn, transmits 520 the collected audio data to the provider 127 by way of the connection to the receiving number. The provider 127, in addition to enabling monitoring devices 107 to connect to the receiving number, transmits the audio data received from the mobile bug 105 to the agency service 115 or appliance 150 over the network 120.

The mobile bug 105 may also collect 510 image data using an image sensor coupled to the mobile bug. The mobile bug 105, in turn, transmits 520 the collected image data to the agency service 115. In some embodiments, the mobile bug 105 downsamples collected image data (e.g., based on available network 120 bandwidth) such that mobile bug 105 can stream image or video in real-time.

Furthermore, the mobile bug 105 may also collect 510 location data from GPS receivers and other direction mechanism coupled to the mobile bug. The mobile bug 105 determines a location measurement including the position of the mobile bug, direction and speed of the mobile bug and associated accuracy of the measurement. The mobile bug 105 transmits 520 the location measurement to the agency service 115. In some embodiments, the mobile bug 105 determines and transmits 520 the location measurements in real-time to the agency service 115.

In some instances, the connection 400 between the mobile bug 105 and the receiving number (e.g., via the provider 127) or the agency service 115 may be terminated or timeout. In the case of a disconnection from the receiving number, the mobile bug 105 attempts to reestablish 540 the terminated connection in the background by redialing the receiving number and automatically providing any necessary key-in information. To reestablish 540 a connection with the agency service 115, the mobile bug 105 may intermittently test network 120 availability and subsequently connect to the agency service 115 when able.

In one embodiment, the mobile bug transmits 520 data collected during disconnect periods in the background of real-time data. For example, while the provider 127 typically handles audio data via the receiving number, the agency service 115 may receive any audio data collected during disconnect periods. Accordingly, the agency service 115 may update 530 the appliance 150 with the received audio data. The agency service 115 or provider 127 can also update 530 the appliance with any other data received from the provider 127 and/or mobile bug 105.

Monitoring a Mobile Bug

FIG. 6 is an interaction diagram illustrating a method for monitoring 600 a mobile bug 105 according to one example embodiment. As described above, the agency service 115 receives 610A collected data from the mobile bug and/or the provider 127. Additionally, the provider 127 may receive data 610B from the mobile bug 105. In turn, the agency service 115 and/or provider 127 may update 530 the appliance at the agency 110. A monitoring device 107 may subsequently monitor 600A, 600B the mobile bug 105 using one or both of the processes outlined below.

In one embodiment, the monitoring device 107 connects 400 to a receiving number or monitoring number for monitoring 600A the mobile bug 105. The monitoring device 107 may be connected 400 by answering an incoming call from the monitoring or receiving number initiated by the provider 127 or dialing a virtual number directly as described with reference to FIG. 4.

Once the connection between the monitoring device 107 and the receiving number or monitoring number is established, the monitoring device 640 receives the live audio transmitted to the receiving number from the mobile bug 105. To continue monitoring 600A the mobile bug 107, the monitoring device 107 simply maintains the connection 400 with the receiving number or monitoring number.

In another embodiment, the monitoring device 107 connects 650 to the agency service 115 and/or appliance 150 for monitoring 600B the mobile bug 105. The monitoring device 107 may establish the connection 650 using a web browser or monitoring module 140 that retrieves or streams collected data via a monitoring interface on the appliance 150 or agency service 115 (e.g., monitoring interface 145).

In one example embodiment, the monitoring device 107 streams 660 image, audio and/or location measurements in real-time from the agency service 115. In addition, the monitoring device 107 can retrieve 670 historical data stored on the appliance 150 to view previous mobile bug 105 operating sessions 500. In some embodiments, the appliance 150 also supports real-time monitoring.

In some instances, the monitoring device 107 receives notifications from the monitoring interface 145 for display in the web browser or with the monitoring module 140. Example notifications include audio or visual alerts for notifying personnel if the mobile bug 105 stops transmitting real-time data to the receiving number, appliance 150 or agency service 115. If the mobile bug 105 reestablishes a connection, the monitoring device 107 may also receive notifications when real-time data streaming has resumed or when data collected by the mobile bug 105 during the disconnected period becomes available Summary The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer based method for configuring a telephonic device as a one-way recorded transmitter (mobile bug), the method comprising:
    receiving information in response to a connection request from the telephonic device to a virtual number, the information including a transmitting number corresponding to the telephonic device and the virtual number;
    identifying the telephonic device as the mobile bug in response to matching the transmitting number of the telephonic device with a transmitting number stored in association with the virtual number in a mapping table;
    transmitting instructions for connecting the mobile bug to the virtual number to permit monitoring of the mobile bug, wherein outgoing audio to the mobile bug is disabled;
    updating a monitoring interface to indicate the mobile bug as actively transmitting for a duration of the connection between the mobile bug and the virtual number;
    receiving audio collected by the mobile bug for the duration of the connection between the mobile bug and the virtual number;
    receiving situational data collected by the mobile bug for the duration of the connection between the mobile bug and the virtual number; and
    synchronizing the received audio with the situational data for presentation.

2. The method of claim 1, wherein situational data collected by the mobile bug includes at least one of an estimate location measurement, still image data and video data, wherein the estimate location measurement is based on global positioning coordinates.

3. The method of claim 2, wherein synchronizing the received audio with the situational data for presentation comprises including tags in the audio data and the situational data to synchronized playback.

4. The method of claim 2, wherein synchronizing the received audio with the situational data for presentation comprises streaming the received audio data in conjunction with the situational data via the monitoring interface.

5. The method of claim 1, further comprising:
    identifying device information of a monitoring device associated with the virtual number in the mapping table; and
    transmitting a notification to the monitoring device in response to the mobile bug actively transmitting.

6. The method of claim 1, further comprising:
    storing a transmitting number of a monitoring device in association with the virtual number in the mapping table;
    receiving information in response to a second connection request from a second telephonic device to the virtual number, the information including a transmitting number corresponding to the second telephonic device and the virtual number;
    identifying the second telephonic device as the monitoring device of the mobile bug in response to matching the transmitting number of the second telephonic device with the transmitting number of the monitoring device stored in association with the virtual number in the mapping table; and
    in response to identifying the second telephonic device as the monitoring device, permitting the monitoring device to monitor the mobile bug.

7. The method of claim 6, wherein permitting the monitoring device to monitor the mobile bug comprises transmitting instructions for connecting the monitoring device to the virtual number and passing the audio collected at the mobile bug to the monitoring device.

8. The method of claim 1, wherein the mapping information for the virtual number includes a key-in for authenticating requests to monitor the mobile bug.

9. The method of claim 1, further comprising:
    provisioning the virtual number based on number information received for the virtual number;
    receiving mapping information for the virtual number, the mapping information including a transmitting number corresponding to the mobile bug; and
    storing the virtual number in the mapping table as a receiving number in association with the transmitting number corresponding to the mobile bug.

10. The method of claim 1, wherein the telephonic device is a mobile phone.

11. A non-transitory computer readable storage medium comprising computer program code for configuring a telephonic device as a one-way recorded transmitter (mobile bug), the computer program code when executed by a processor causing the processor to perform steps comprising:
    receiving information in response to a connection request from the telephonic device to a virtual number, the information including a transmitting number corresponding to the telephonic device and the virtual number;
    identifying the telephonic device as the mobile bug in response to matching the transmitting number of the telephonic device with a transmitting number stored in association with the virtual number in a mapping table;

transmitting instructions for connecting the mobile bug to the virtual number to permit monitoring of the mobile bug, wherein outgoing audio to the mobile bug is disabled;

updating a monitoring interface to indicate the mobile bug as actively transmitting for a duration of the connection between the mobile bug and the virtual number;

receiving audio collected by the mobile bug for the duration of the connection between the mobile bug and the virtual number;

receiving situational data collected by the mobile bug for the duration of the connection between the mobile bug and the virtual number; and synchronizing the received audio with the situational data for presentation.

12. The computer readable storage medium of claim 11, wherein situational data collected by the mobile bug includes at least one of an estimate location measurement, still image data and video data, wherein the estimate location measurement is based on global positioning coordinates.

13. The computer readable storage medium of claim 12, wherein synchronizing the received audio with the situational data for presentation comprises including tags in the audio data and the situational data to synchronized playback.

14. The computer readable storage medium of claim 12, wherein synchronizing the received audio with the situational data for presentation comprises streaming the received audio data in conjunction with the situational data via the monitoring interface.

15. The computer readable storage medium of claim 11, further comprising computer program code for:
identifying device information of a monitoring device associated with the virtual number in the mapping table; and
transmitting a notification to the monitoring device in response to the mobile bug actively transmitting.

16. The computer readable storage medium of claim 11, further comprising computer program code for:

storing a transmitting number of a monitoring device in association with the virtual number in the mapping table;

receiving information in response to a second connection request from a second telephonic device to the virtual number, the information including a transmitting number corresponding to the second telephonic device and the virtual number;

identifying the second telephonic device as the monitoring device of the mobile bug in response to matching the transmitting number of the second telephonic device with the transmitting number of the monitoring device stored in association with the virtual number in the mapping table; and in response to identifying the second telephonic device as the monitoring device, permitting the monitoring device to monitor the mobile bug.

17. The computer readable storage medium of claim 16, wherein permitting the monitoring device to monitor the mobile bug comprises transmitting instructions for connecting the monitoring device to the virtual number and passing the audio collected at the mobile bug to the monitoring device.

18. The computer readable storage medium of claim 11, wherein the mapping information for the virtual number includes a key-in for authenticating requests to monitor the mobile bug.

19. The computer readable storage medium of claim 11, further comprising computer program code for:
provisioning the virtual number based on number information received for the virtual number;
receiving mapping information for the virtual number, the mapping information including a transmitting number corresponding to the mobile bug; and
storing the virtual number in the mapping table as a receiving number in association with the transmitting number corresponding to the mobile bug.

20. The computer readable storage medium of claim 11, wherein the telephonic device is a mobile phone.

* * * * *